United States Patent [19]
Coon et al.

[11] 3,759,998
[45] Sept. 18, 1973

[54] 2,2-BIS (DIFLUORAMINO)-5-FLUORO-5, 5-DINITRO-1-PENTANOL

[75] Inventors: Clifford L. Coon, Fremont; Marion E. Hill, Palo Alto; Donald L. Ross, Menlo Park, all of Calif.

[73] Assignee: The United States of America as represented by the Secretary of the Navy, Washington, D.C.

[22] Filed: Oct. 10, 1969

[21] Appl. No.: 866,437

[52] U.S. Cl............... 260/584 R, 149/109, 260/487
[51] Int. Cl........................ C07c 87/22, C07c 91/00
[58] Field of Search ................................. 260/584 R

[56] References Cited
UNITED STATES PATENTS
3,439,039   4/1969   Petry et al. .......................... 260/584

*Primary Examiner*—Leland A. Sebastian
*Attorney*—Richard S. Sciascia, Q. Baxter Warner and J. M. St. Amand

[57] ABSTRACT

2,2-bis (difluoramino)-5-fluoro-5,5-dinitro-1-pentanol having plasticizer properties for double-base propellants is synthesized by reacting 2,2-bis (difluoramino)-5-fluoro-5,5-dinitro-1-pentyl trifluoracetate with methanol.

4 Claims, No Drawings

2,2-BIS (DIFLUORAMINO)-5-FLUORO-5,5-DINITRO-1-PENTANOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to plasticizer compounds for propellants and more particularly to a novel plasticizer compound containing both fluoro-dinitro and difluoramino groupings and to a method of making same.

2. Description of the Prior Art

Considerable research is currently being carried out on compounds containing nitrogen and fluorine due to their utility as propellants and explosives or as additives for such products. As additives nitrogen and fluorine containing compounds are employed to increase stability, specific impulse, burning rate, etc. Some problems are associated with propellant ingredients containing difluoramino groups. However the present plasticizer composition contains the relatively stable geminate-difluoramino group as well as the fluorodinitromethyl group in addition to an alcohol moiety. It is relatively free of any problem normally associated with such propellant plasticizers due to the alcohol group which makes the compound unique and is believed responsible for enhancing the plasticizing action of the compound.

SUMMARY OF THE INVENTION

The present invention involves the novel plasticizer 2,2-bis (difluoramino)-5-fluoro-5,5-dinitro-1-pentanol adapted to be incorporated into double-base propellants for upgrading purposes. The compound is prepared by reacting 2,2-bis (difluoramino)-5-fluoro-5,5-dinitro-1-pentyl trifluoracetate with methanol. The complex acetate reactant is prepared through a series of reactions starting with an unsaturated 2-butyne-1,4-diol and ending with the acetate compound having the stable geminate-difluoramino group and the fluorodinitro methyl group.

OBJECTS OF THE INVENTION

It is an object of the present invention to provide an improved plasticizer composition for propellant materials.

Another object of this invention is to provide a propellant binder composition having the stable geminate-difluoramino group and fluorodinitromethyl group in addition to an alcohol moiety.

It is a further object to provide an improved plasticizer which upgrades the propellants by increasing specific impulse and burning rate.

It is a still further object to provide a plasticizer composition which is economical to synthesize and efficient in operation.

Other objects, advantages, and novel features of the invention will become apparent from the following detailed description.

DESCRIPTION OF THE PREFERRED EMBODIMENT

The novel compound 2,2-bis (difluoramino)-5-fluoro-5,5-dinitro-1-pentanol is produced by reacting 2,2-bis (difluoramino)-5-fluoro-5,5-dinitro-1-pentyl trifluoracetate with methanol in accordance with the equation:

$FC(NO_2)_2CH_2CH_2C(NF_2)_2CH_2OCOCF_3 + CH_3OH \rightarrow FC(NO_2)_2CH_2CH_2C(NF_2)_2CH_2OH$ Preparation of the reactant 2,2-bis (difluoramino)-5-fluoro-5,5-dinitro-1-pentyl trifluoracetate involves a synthesis route as shown by the series of equations:

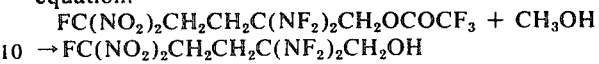
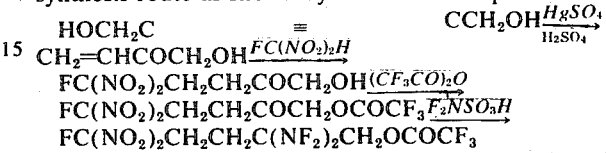

$FC(NO_2)_2CH_2CH_2C(NF_2)_2CH_2OCOCF_3$

The following example illustrates the preferred method for synthesizing 2,2-bis (difluoramino)-5-fluoro-5,5-dinitro-1-pentanol starting with 2-butyne-1,4-diol.

EXAMPLE

Preparation of 5-fluoro-5,5-dinitro-2-oxo-1-pentanol

A mixture of 21.3 grams (0.25 mole) of 2-butyne-1,4-diol; 0.82 milliter of 96% $H_2SO_4$; 1.28 grams (0.005 mole) of $HgSO_4$ and 140 milliters of water was stirred at 50°C for 1 hour. The mixture was cooled and filtered. A solution of 13.2 grams (0.11 mole) fluorodinitromethane in 125 milliliters of water was then added dropwise over 0.5 hour. The mixture was stirred at ambient temperature under nitrogen for 24 hours.

The reaction mixture was purified by saturating with NaCl and extracted with three 25 milliliter portions of $CH_2Cl_2$. The $CH_2Cl_2$ solution was dried over magnesium sulfate, filtered and evaporated leaving 10.6 grams of a pale yellow semi-solid, 50% crude yield. The product 5-fluoro-5,5-dinitro-2-oxo-1-pentanol was recrystallized from chloroform-hexane giving white needles with a melting point of 49–50°C.

Preparation of 5-Fluoro-5,5-Dinitro-2-Oxo-1 Pentyl Trifluoracetate

A mixture of 15.8 grams (0.184 mole) of $Na_2CO_3$ and 150 milliliters of $CH_2Cl_2$ was cooled to 0°C and 14.7 grams (0.070 mole) of trifluoracetic anhydride was added dropwise. To this stirred mixture was added a solution of 9.6 grams (0.046 mole) of 5-fluoro-5,5-dinitro-2-oxo-1-pentanol in 50 milliliters of $CH_2Cl_2$. After stirring for 1.5 hours at 0–5°C, the reaction mixture was heated to reflux temperature for 1.5 hours. The mixture was cooled to room temperature and filtered. The $CH_2Cl_2$ was then allowed to evaporate leaving 11.5 grams of pale yellow oil, 82% yield. The product 5-fluoro-5,5-dinitro-2-oxo-1-pentyl trifluoracetate was distilled at 110°C.

Preparation of 2,2-Bis (difluoramino)-5-Fluoro-5,5-Dinitro-1-Pentyl Trifluoracetate A solution of difluoraminosulfonic acid was prepared by the addition of 7.0 milliliters (11.0 grams) of $HNF_2$ to 23 milliliters of 30% fuming $H_2SO_4$ at 0°C. A 5.1 gram sample of 5-fluoro-5,5-dinitro-2-oxo-1-pentyl trifluoracetate in 20 milliliters of $CH_2Cl_2$ was added dropwise over a 1 hour period, and the resulting mixture was allowed to stir for 3 hours at 0–5°C. The acid phase was discarded. The organic phase was dried (MgSO$_4$), and the solvent was removed leaving 4.04 grams (61%) of a light yellow liquid. A 0.5 gram sample of this liquid was purified by short path distillation, boiling point 70–74°C and identified as 2,2-bis (difluoramino)-5,5-dinitro-1-pentyl trifluoracetate.

Preparation of 2,2-Bis (difluoramino)-5-Fluoro-5,5-Dinitro-1-Pentanol

A solution of 20.48 grams of crude 2,2-bis (difluoramino)-5-fluoro-5,5-dinitro-1-pentyl trifluoracetate in 25 milliliters methanol was refluxed for 1 hour. The solvent was removed under vacuum leaving 16.48 grams of a light yellow liquid. This liquid was passed through a silica gel column using a 1:1 mixture of chloroform and hexane as eluent and fractions were collected. The fraction which eluted first yielded 2.71 grams of colorless liquid which contained no hydroxyl group. This product could not be distilled. It was identified as being 2,4-bis (difluoramino)-2-trifluoromethyl-4-(3-fluoro-3,3-dinitropropyl)-1,3-dioxolane.

The second fraction which was eluted with pure CHCl$_3$ gave 12.8 grams of a colorless liquid containing a hydroxyl group. This product was purified by short path distillation, boiling point 80–85°C and identified as 2,2-bis (difluoramino)-5-fluoro-5,5-dinitro-1-pentanol. It has the empirical formula $C_5H_7N_4O_5F_5$; is pale yellow in appearance, has a melting point of about 14°C and a boiling point of between 79–80°C.

While the novel compound 2,2-bis (difluoramino)-5-fluoro-5,5-dinitro-1-pentanol is primarily employed as an active plasticizer for double-base propellants, it also has a potential use in upgrading such double-base propellants by increasing the specific impulse and burning rate. The alcohol group of the present plasticizer is believed to be responsive for enhancing the plasticizing action thereof.

We claim:

1. The compound 2,2-bis (difluoramino)-5-fluoro-5,5-dinitro-1-pentanol having the formula: $FC(NO_2)_2CH_2CH_2C(NF_2)_2CH_2OH$.

2. The method of synthesizing 2,2-bis (difluoramino)-5-fluoro-5,5-dinitro-1-pentanol comprising:
   reacting 2,2-bis (difluoramino)-5-fluoro-5,5-dinitro-1-pentyl trifluoracetate with methanol.

3. The method of claim 2 wherein the preferred amount of 2,2-bis (difluoramino)-5-fluoro-5,5-dinitro-1-pentyl trifluoracetate is 20.48 grams and the preferred amount of methanol is 25 milliliters.

4. The method of synthesizing 2,2-bis (difluoramino)-5-fluoro-5,5-dinitro-1-pentanol starting with 2-butyne-1,4-diol in accordance with the following series of equations:

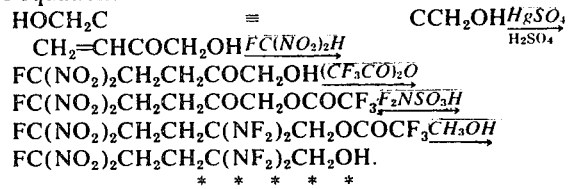

$$HOCH_2C\equiv CCH_2OH \xrightarrow{H_2SO_4}$$
$$CH_2=CHCOCH_2OH \xrightarrow{FC(NO_2)_2H}$$
$$FC(NO_2)_2CH_2CH_2COCH_2OH \xrightarrow{(CF_3CO)_2O}$$
$$FC(NO_2)_2CH_2CH_2COCH_2OCOCF_3 \xrightarrow{F_2NSO_3H}$$
$$FC(NO_2)_2CH_2CH_2C(NF_2)_2CH_2OCOCF_3 \xrightarrow{CH_3OH}$$
$$FC(NO_2)_2CH_2CH_2C(NF_2)_2CH_2OH.$$

* * * * *